United States Patent
Knight

[15] 3,667,545
[45] June 6, 1972

[54] FLOODING EFFICIENCY WITH ZONE BOUNDARY PLUGGING

[72] Inventor: Bruce L. Knight, Littleton, Colo.

[73] Assignee: Marathon Oil Company, Findlay, Ohio

[22] Filed: Sept. 28, 1970

[21] Appl. No.: 75,859

[52] U.S. Cl. .............................................. 166/269, 166/273
[51] Int. Cl. .................................. E21b 33/138, E21b 43/22
[58] Field of Search .................. 166/269, 268, 273, 274, 285, 166/292, 294, 295

[56] References Cited

UNITED STATES PATENTS

| | | |
|---|---|---|
| 2,786,530 | 3/1957 | Maly ................................... 166/294 X |
| 3,013,607 | 12/1961 | Bond et al. ............................. 166/269 |
| 3,193,007 | 7/1965 | Kiel et al. ............................ 166/294 X |
| 3,148,730 | 9/1964 | Holbert ............................. 166/269 X |
| 3,254,714 | 6/1966 | Gogarty et al. ........................ 166/274 |
| 3,261,400 | 7/1966 | Elfrink ............................... 166/269 X |
| 3,366,175 | 1/1968 | Ferrell et al. .......................... 166/273 |
| 3,369,603 | 2/1968 | Trantham ......................... 166/294 X |
| 3,400,761 | 9/1968 | Latimer, Jr. et al. .................. 166/274 |
| 3,497,006 | 2/1970 | Jones et al. ............................ 166/273 |
| 3,506,071 | 4/1970 | Jones ................................... 166/273 |

*Primary Examiner*—Stephen J. Novosad
*Attorney*—Joseph C. Herring, Richard C. Willson, Jr. and Jack L. Hummel

[57] ABSTRACT

Injection of an aqueous solution containing a mobility reducing agent into a portion of a highly permeable zone adjacent to a lesser permeable zone is effective to influence zone boundary plugging in a highly stratified reservoir and thereby increase the efficiency of a subsequent micellar flooding process in the highly and/or lesser permeable zone(s). Such reduces or eliminates micellar slug loss to the tighter zones. Thus, a more economical flood can be effected.

6 Claims, 1 Drawing Figure

RESERVOIR HAVING A LESSER AND HIGHLY PERMEABLE ZONES

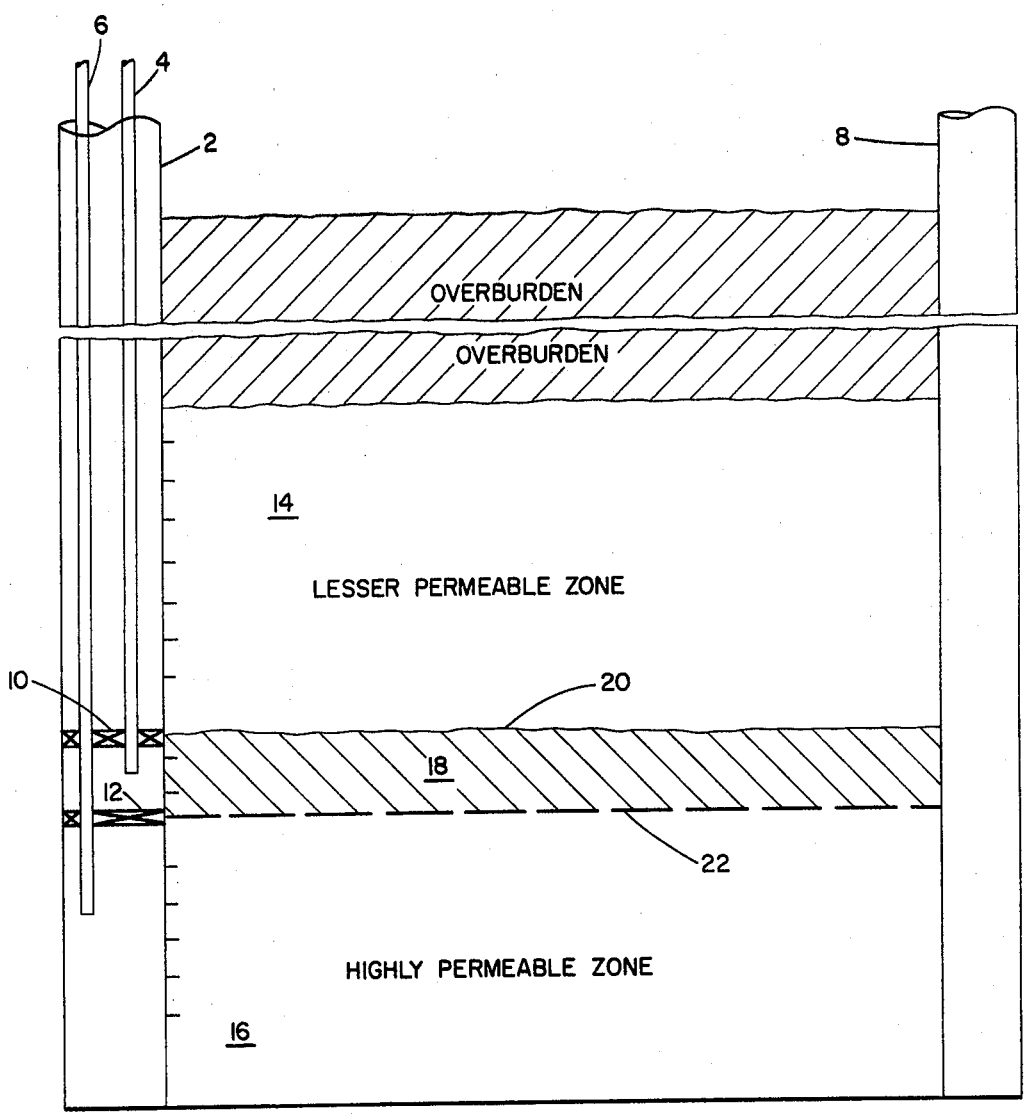
RESERVOIR HAVING A LESSER AND HIGHLY
PERMEABLE ZONES
*INVENTOR*
BRUCE L. KNIGHT
BY
*ATTORNEY*

FLOODING EFFICIENCY WITH ZONE BOUNDARY PLUGGING

BACKGROUND OF THE INVENTION

1. Field of the Invention

This invention relates to inhibiting the transfer of fluids between a highly permeable and a lesser permeable zone by establishing a polymer barrier at about the juncture of the zones. Thereafter, improved flooding, e.g., with micellar dispersion, can be effected. High molecular weight polyacrylamide polymers are useful for this process.

2. Description of the Prior Art

Polymer solutions are useful in waterflooding to improve oil recovery. U.S. Pat. No. 3,400,761 to Latimer, Jr. et al. teaches an improved oil recovery process wherein a polymer solution is used to block an oil pool from a gas cap. U.S. Pat. Nos. 3,308,885 to Sandiford and 3,039,529 to McKennon teach the use of water-soluble polymers, e.g., acrylamide polymers, to increase the viscosity of water and thereby improve the yield of a waterflood.

It has been observed that flooding with a micellar dispersion in a formation containing a zone of relatively high permeability which lies adjacent to a zone of much lower permeability (the zones having some vertical permeability), the micellar solution, in addition to being propagated laterally, travels vertically into the low permeability zone to a much greater degree than would be expected from fluid flow considerations alone.

SUMMARY OF THE INVENTION

Applicant has discovered that injecting an aqueous solution containing a mobility-reducing, high molecular weight polymer into a portion of a high permeability zone, along with the simultaneous injection of water into the residue of the highly permeable zone, is useful to inhibit fluid transfer between the two zones of different permeability. Thereafter, a miscible or miscible-like displacing slug can be injected and displaced in zones of "uniform" permeability to efficiently recover crude oil therefrom.

BRIEF DESCRIPTION OF THE DRAWING

The FIGURE of the drawing illustrates a cross section of a subterranean reservoir having lesser and highly permeable zones with injection and production wells in communication therewith.

DESCRIPTION OF THE DRAWING

The drawing illustrates a cross section of a subterranean formation having injection well 2 in fluid communication with production well 8 via lesser permeable zone 14 and highly permeable zone 16 (initially includes zone 18), the juncture of zones 14 and 16 is at 20. Packer 10 separates at 20 lesser permeable zone 14 from highly permeable zone 16 and packer 12 separates permeable zone 16 into zone 18 and zone 16 at line 22. Tubing 4 is in fluid communication with zone 18 and tubing 6 is in fluid communication with zone 16. The annulus of the injection well is in fluid communication with zone 14. The mobility reducing fluid is injected into zone 18 while water is simultaneously injected into zone 16, the effect of which is to create a barrier between zones 14 and 16 to substantially prevent vertical transfer of a displacing fluid that is subsequently injected into zone 16 or zone 14.

PREFERRED EMBODIMENTS OF THE INVENTION

To improve efficiency of flooding with a micellar dispersion in a highly stratified reservoir, i.e., containing a highly permeable zone and a lesser permeable zone, an aqueous solution containing a mobility reducing agent is injected into a portion of the highly permeable zone at about the juncture of the zones. Simultaneously, water is injected into the residue of the highly permeable zone at desired conditions, e.g., higher rates, to substantially keep the aqueous mobility solution confined at the juncture. The desired effect is to inhibit fluid communication between the highly and lesser permeable zones. Ideally, enough polymer is injected to extend to production wells in fluid communication with the reservoir. From a practical standpoint, the polymer preferably extends a major part of the distance from the injection well to the production well(s). However, the practical application of the invention depends on the thickness of the oil-producing sandstone in the permeable zone(s) to be flooded by the displacing agent.

The polymer injection rate is dependent upon polymer concentration, fracture pressure of the reservoir, etc. Polymer concentration may vary from about 50 to about 2,000 ppm for a typical partially hydrolyzed, high molecular weight polyacrylamide, e.g., Pusher 700, marketed by Dow Chemical Company, Midland, Mich. Concentrations of about 25 ppm or less are useful in certain reservoirs.

It is well known in the oil recovery art that an injected fluid will tend to find a path of least flow resistance. High molecular weight polymers tend to channel to the zone of highest permeability. To prevent this, water is simultaneously injected into the remaining section of the more permeable zone at a rate exceeding the polymer injection rate. The purpose of water injection is to reduce the vertical pressure drop across the permeable zone arising from the injection of the high molecular weight polymer. The water will thus serve to substantially reduce or eliminate channeling of the polymer solution into the bulk of the more permeable zone, thus confining the injected polymer. To accomplish the simultaneous injection of the polymer solution and water into the well, tubing strings 4 and 6 and special packers 10 and 12 are arranged as illustrated in the drawing.

As mentioned earlier, an objective of this invention is to substantially prevent fluid communication between the two zones of different permeability. Once communication is inhibited, independent flooding of the two zones can take place. The successful application of this process is dependent upon a number of factors. The difference in permeability between the highly and lesser permeable zones should be substantial, i.e., at least fivefold. A relatively well defined boundary between the highly and lesser permeable zones is desirable.

This process is not restricted with respect to time, temperature or injection pressure. The criterion for time is merely that time necessary for propagation of the concentrated polymer solution to the desired distance between the injection well and the production well. Injection pressure is not a critical factor and is dependent on the permeability of the zone being flooded with the high molecular weight polymer. In fact, prior tests can be made to ascertain the permeability of the zone which is to be plugged with the high molecular weight polymer. The polymer solution may be injected at ambient or higher temperature.

The term micellar dispersion as used herein is meant to include micellar solutions, microemulsions, transparent emulsions, etc. Examples of these dispersions and use of same to recover crude oil are defined in U.S. Pat. Nos. 3,254,714 to Gogarty et al.; 3,497,006 to Jones et al.; 3,506,070 to Jones etc.

The following examples teach specific embodiments of the invention. Such are not to be constructed as limiting the invention.

EXAMPLE I

A reservoir with a lesser permeable zone overlying a highly permeable zone has the following properties:

|  | Lesser Perm. zone | | | Highly Perm. zone | | |
|---|---|---|---|---|---|---|
|  | min. | typical | max. | min. | typical | max. |
| Net Thickness, ft | – | 10 | – | – | 20 | – |
| Permeability, md. | 0.1 | 5 | 20 | – | 50 | – |
| Porosity, % | – | 15 | – | – | 20 | – |
| Oil Saturation, % | – | 75($S_{oi}$) | – | – | 30($S_{or}$) | – |
| (Permeability ratio 10:1) | | | | | | |

Oil saturations ($S_{oi}$ = initial oil saturation and $S_{or}$ = residual oil saturation) indicate extensive oil recovery due to waterflooding in the more permeable zone and virtually no production from the tight zone.

An aqueous solution containing a partially hydrolyzed, high molecular weight polyacrylamide is injected into the upper portion (about 5 feet nominal thickness) of the more permeable zone at a rate of about 5 BPD/ft of thickness. Water is simultaneously injected into the remaining (15 feet nominal thickness) section of the more permeable zone at a rate exceeding the polymer injection rate, i.e., 10–15 BPD/ft of thickness. The injection well is constructed as illustrated in the figure. The injected water serves to substantially reduce or eliminate channeling of the polymer solution into the bulk of the more permeable zone, i.e., confines the frontal movement of the polymer solution. Total injected fluid volumes are about one pore volume of polymer solution (based on the upper section of the more permeable zone) and 2–3 pore volume of water (based on the more permeable zone). After the polymer solution is injected to a distance of about the production well in fluid communication with the formation, a 5 percent pore volume micellar dispersion slug is injected, followed by 50 percent pore volume mobility buffer and finally sufficient drive water to displace the dispersion to the production well. Oil is recovered and the process experiences an economical recovery with substantially no costly flooding agent, i.e., micellar dispersion, being lost to the lesser permeable zone.

EXAMPLE II

A reservoir identical to that in Example I is again flooded. The polymer injection rate, zone thickness, injection fluid volume, apparatus, pore volumes of micellar dispersion and mobility buffer, etc. are duplicated. However, the lesser permeable zone is flooded with a micellar dispersion having a relatively high mobility followed by a mobility buffer (dilute polymer solution) and then drive water. The two zones are efficiently flooded and large amounts of oil are recovered.

It is to be understood that the invention is capable of a number of modifications and variations which will be made apparent to those skilled in the art by a reading of the specification, and which are to be included within the scope of the invention as defined in the specification and claims.

What is claimed is:

1. An improved process for recovering crude petroleum fluids from a permeable subterranean formation having at least a highly permeable zone and a lesser permeable zone, the highly permeable zone having an average permeability at least fivefold greater than the average permeability of the lesser permeable zone, and the formation having at least one injection means and one recovery means in fluid communication with each other and wherein the injection means is separately in communication with the highly permeable zone, the lesser permeable zone and a portion in the highly permeable zone adjacent to the lesser permeable zone, the improved process comprising injecting into a portion of the highly permeable zone adjacent to the lesser permeable zone an aqueous solution containing a mobility-reducing agent and simultaneously injecting into the residue of the highly permeable zone an aqueous medium, the effect of which is to substantially reduce fluid communication at the juncture of the highly and lesser permeable zones, thereafter injecting a micellar dispersion into the lesser and/or highly permeable zone(s) and displacing the micellar dispersion toward at least one production means to recover crude oil therethrough.

2. The process of claim 1 wherein the mobility reducing agent is a partially hydrolyzed, high molecular weight polyacrylamide.

3. The process of claim 1 wherein the concentration of the mobility reducing agent in the aqueous solution is within the range of about 50 to about 2,000 ppm.

4. The process of claim 1 wherein the aqueous medium simultaneously injected into the residue of the highly permeable zone is injected at a rate higher than the aqueous solution containing the mobility reducing agent.

5. The process of claim 1 wherein the micellar dispersion is followed by a mobility buffer.

6. The process of claim 5 wherein a drive water is injected behind the mobility buffer to displace the micellar dispersion toward the production means.

* * * * *